(No Model.)

W. COOK.
VELOCIPEDE SADDLE.

No. 364,903. Patented June 14, 1887.

Witnesses.
Robert Gwatt,
Percy. B. Hills.

Inventor:
William Cook.
By James L. Norris.
Atty.

United States Patent Office.

WILLIAM COOK, OF REDDITCH, COUNTY OF WORCESTER, ENGLAND.

VELOCIPEDE-SADDLE.

SPECIFICATION forming part of Letters Patent No. 364,903, dated June 14, 1887.

Application filed February 21, 1887. Serial No. 228,450. (No model.) Patented in England September 2, 1885, No. 10,383.

*To all whom it may concern:*

Be it known that I, WILLIAM COOK, of Redditch, in the county of Worcester, England, have invented new and useful Improvements in Bicycle and Tricycle Saddles and Springs, (for which I have obtained a patent in Great Britain, No. 10,383, bearing date September 2, 1885,) of which the following is a specification.

This invention consists in forming the saddle or seat of bicycles and tricycles of a framework of wire and continuing the same wire at the back or at both the back and the front of the saddle or seat in the form of coils, so as to form the saddle-springs, thus forming the saddle frames and springs in one piece. The leather forming the seat of the saddle is stretched over the frame-work and its edges laced together on the under side, thereby enabling the saddle to be tightened up when desired.

The saddles may be attached to the backbone of the machine by causing a coil or coils of the wire where it forms the front spring to clip a pin or projection, and coiling the wire where it forms the back spring round a pin or bar carried by a piece of metal which clips the backbone. An adjustable saddle may be made by carrying both front and back portions upon such clips.

I do not confine my invention to any particular form of saddle or frame, or to any particular arrangement of the coils of the wire forming the springs.

I will illustrate my invention by the aid of a drawing of a side-driving-tricycle saddle-frame and a complete saddle as applied to a bicyle or center-driving tricycle.

Referring to the drawings, in which similar letters upon the figures refer to similar parts, Figure 1 illustrates the frame-work and back springs for a side-driving tricycle made of one continuous piece of wire, $a$ being the portion forming the frame-work of the seat, and $c$ the portion forming the springs. The front portion, at $b$, will clip a pin or projection upon the bicycle or tricycle, the ends of the coil portions $c$ being riveted or otherwise attached to the plate $d$, which is attached to the machine by an ordinary clip, $e$. An ordinary flat spring, $s$, carries the front portion, $b$, of the saddle-frame.

Figure 1:
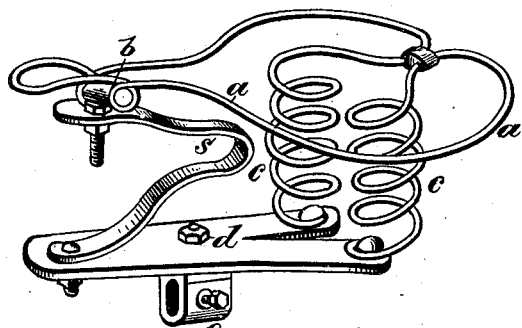
Figure 2:
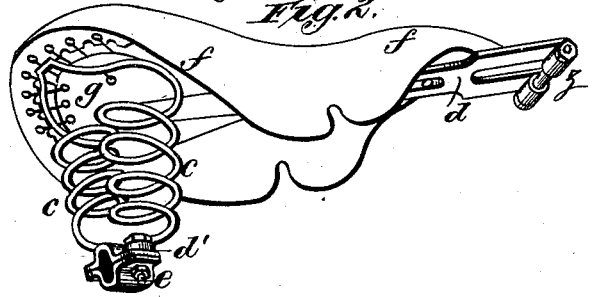
Fig. 2 illustrates a complete saddle as applied to a bicycle or center-driving tricycle, with the coil-spring portions $c$, the ends of which are coiled round the pins $d'$ upon the clip $e$, which clip fastens the saddle to the backbone of the machine in the ordinary way.
Figure 3:
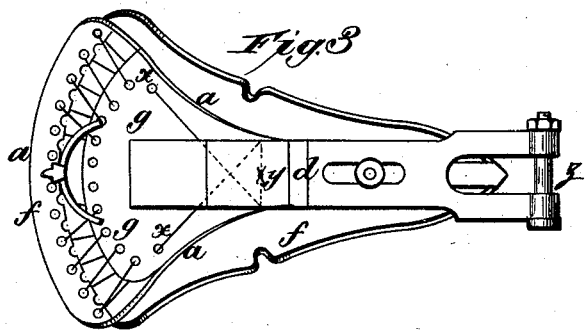
Fig. 3 is a view of the under side of a saddle of the same form as that illustrated by Fig. 2; but the coil-spring portion has been omitted in the drawings for the better illustration of the other parts.

To form the seat, the leather $f$ is turned over and stretched upon the frame-work $a$, and its edges laced to the under leather or cantle, $g$, as shown at $x$, and tied, at $y$, behind the plate $d$, which plate is attached to the machine in the ordinary way at $z$.

What I claim as my invention, and desire to secure by Letters Patent, is—

1. The combination, with the plate $d$, of the frame $a$ and coils $c$, constructed of one piece of wire and adapted to form a spring-support for the saddle or seat of a bicycle or tricycle, substantially as described.

2. The combination of the frame $a$ and coils $c$, formed of one piece of wire, and the leather saddle $f$, stretched and laced over said frame, substantially as described.

3. The combination of the plate $d$, the spring-frame $a$, formed with coils $c\ c$, secured to said plate, and the spring $s$, substantially as described.

WILLIAM COOK.

Witnesses:
HENRY F. TALBOT,
EDWARD BARTON PAYNE.